US008740419B2

(12) United States Patent
Bronowicz et al.

(10) Patent No.: US 8,740,419 B2

(45) Date of Patent: Jun. 3, 2014

(54) ELECTRICAL CIRCUIT ARRANGEMENT

(75) Inventors: Jacek Bronowicz, Dorsten (DE); Bernhard Roemer, Duisburg (DE)

(73) Assignee: FHF Funke + Huster Fernsig GmbH, Muelheim an der Ruhr (DE)

( * ) Notice: Subject to any disclaimer, the term of this patent is extended or adjusted under 35 U.S.C. 154(b) by 238 days.

(21) Appl. No.: 13/054,148

(22) PCT Filed: Jul. 28, 2009

(86) PCT No.: PCT/EP2009/005442

§ 371 (c)(1), (2), (4) Date: Feb. 16, 2011

(87) PCT Pub. No.: WO2010/012443

PCT Pub. Date: Feb. 4, 2010

(65) Prior Publication Data

US 2011/0176317 A1 Jul. 21, 2011

(30) Foreign Application Priority Data

Jul. 30, 2008 (DE) ..................... 20 2008 010 175 U

(51) Int. Cl.

| | |
|---|---|
| ***B60Q 1/06*** | (2006.01) |
| ***F21V 19/00*** | (2006.01) |
| ***F21V 21/00*** | (2006.01) |
| ***F21V 29/00*** | (2006.01) |

(52) U.S. Cl.

USPC ............ 362/373; 362/382; 362/267; 362/376

(58) Field of Classification Search

USPC ......................................... 362/294, 373, 382

See application file for complete search history.

(56) References Cited

U.S. PATENT DOCUMENTS

| | | | | |
|---|---|---|---|---|
| 4,066,115 | A | 1/1978 | Ohtani | |
| 4,729,076 | A | 3/1988 | Masami | |
| 4,871,251 | A | 10/1989 | Preikschat | |
| 6,000,819 | A * | 12/1999 | Graber et al. | 362/376 |
| 6,866,394 | B1 * | 3/2005 | Hutchins et al. | 362/192 |
| 7,682,055 | B2 * | 3/2010 | Shuai et al. | 362/373 |
| 7,755,901 | B2 * | 7/2010 | Shen | 361/719 |
| 2007/0153520 | A1 | 7/2007 | Curran | |
| 2007/0258244 | A1 | 11/2007 | Curran | |
| 2007/0285924 | A1 * | 12/2007 | Morris et al. | 362/264 |
| 2007/0285926 | A1 * | 12/2007 | Maxik | 362/294 |
| 2008/0002410 | A1 | 1/2008 | Burton | |

(Continued)

FOREIGN PATENT DOCUMENTS

| | | | |
|---|---|---|---|
| DE | 2004003 | U | 8/2003 |
| EP | 1925879 | A | 5/2008 |
| GB | 2428467 | A | 1/2007 |

*Primary Examiner* — David J Makiya

(74) *Attorney, Agent, or Firm* — Andrew Wilford

(57) ABSTRACT

The present invention relates to an electrical circuit arrangement, in particular an electrical signal circuit arrangement and preferably a signal lamp which is used in hazardous areas. The circuit arrangement is equipped with at least one electrical component (1) which is arranged on a printed circuit board (2) produced from a heat-conducting material. The electrical component (1) is, in particular, a luminous means (1). A cooling device (6, 7) which is in thermal contact with the printed circuit board (2) is also realized. According to the invention, the cooling device (6, 7) is in at least two parts, with a heat sink (7) and at least one heat pipe (6). In this case, the heat pipe (6) thermally connects the printed circuit board (2) to the heat sink (7).

6 Claims, 3 Drawing Sheets

(56) References Cited

U.S. PATENT DOCUMENTS

2008/0116475 A1* 5/2008 Chen ............................... 257/99
2008/0253125 A1* 10/2008 Kang et al. .................... 362/294
2009/0021944 A1* 1/2009 Lee et al. ...................... 362/294
2009/0080187 A1* 3/2009 Chou ............................ 362/231

* cited by examiner

ELECTRICAL CIRCUIT ARRANGEMENT

CROSS REFERENCE TO RELATED APPLICATIONS

This application is the US national phase of PCT application PCT/EP2009/005442, filed 28 Jul. 2009, published 4 Feb. 2010 as WO2010/012443, and claiming the priority of German patent application 202008010175.1 itself filed 30 Jul. 2008.

FIELD OF THE INVENTION

The invention relates to an electrical circuit assembly, in particular, an electrical signal circuit assembly, preferably, a signal lamp, for use in locations at risk of explosion, comprising at least one electrical component, in particular a light source, mounted on a circuit board made of a thermally conductive material, and a cooling device in thermal contact with the circuit board. The light sources on the circuit board and referenced here are typically one or more LEDs.

BACKGROUND OF THE INVENTION

Signal lamps are typically employed to generate one or more optical signals that indicate possible hazards, special conditions, etc. For example, signal lamps are used to signal or provide a warning about, for example, malfunctions in machines. However, signal lamps can just as well indicate escape routes, or sometimes even display advertising. This applies in the case of acoustic signaling devices that can also qualify as electrical signal circuit assemblies as defined above.

Whenever, by way of example, light sources are mounted on a circuit board composed of a heat-conducting material, the problem of dissipating the heat arises in connection with special applications. This is true specifically in the case of electrical circuit assemblies in general, and specifically for signal lamps that are used in locations at risk of explosion, that is, what are called explosion-protected electrical (signal) circuit assemblies, or signal lamps, or even signaling loudspeakers. Signal lamps of this type on the one hand have a pressure-tight encapsulation of the housing, with the result that the dissipation of waste heat is a problem. Alternately, the housings are filled either completely or to a substantial degree with a potting compound, with the result that analogous problems arise since this type of potting compound typically has extremely poor thermal conductivity.

The above-referenced problem thus applies in general for all housings of signal lamps, since an increase in the accumulation of waste heat must be expected due to the generally high luminous intensity of the light sources. Inside the housing, this waste heat can result in an increase in temperature relative to the surrounding ambient temperature. The increased temperature inside the housing renders the use of signal lamps problematic in the case of the example involving locations at risk of explosion. This is because there is the risk of heating up certain parts of the housing to a significantly higher temperature than other parts. As a result, what are known as hot spots are observed on the surface of the device that can present a source of ignition for the surrounding atmosphere in locations at risk of explosion.

This is true not only in the case of certain mixtures of gas or when ignitable gases occur, but also, for example, in the case of combustible dust when powder is processed. What must also be taken into account as an additional factor in this situation is the fact that the smaller the distance between the heat source and the surface, the higher is the partial heating due to radiation and convection. This means that the occurrence of the above-described hot spots is enhanced by the small spacing between the heat source and the surface, and by the insufficient dissipation of heat from the surface.

For these reasons, the analogous prior art according to GB 2,428,467 has a projecting cooling element for an explosion-protected signal lamp. The cooling element or cooling block is in contact with the surrounding atmosphere. The circuit board including LEDs mounted thereon is located on the cooling element or cooling block. The circuit board itself is made of aluminum or another suitable material of high thermal conductivity.

The fact that the circuit board in the prior art must be mounted, or is mounted, with its mounted LEDs directly on the cooling block, necessarily means that the possible embodiments in terms of the design of the signal lamp are limited. In particular, it is virtually impossible by this approach to create cylindrical or very tall signal lamps that are equipped with a slender, long housing. The goal of the invention is to provide a remedy for this.

OBJECT OF THE INVENTION

The object of this invention is to further develop an electrical circuit assembly of this type so that limitations in the design are no longer encountered and a cost-effective embodiment is achieved.

SUMMARY OF THE INVENTION

To attain this object, the invention proposes an approach for an electrical circuit assembly of the generic type where the cooling device is of a two-part design comprising a cooling element and at least one heat pipe, the heat pipe being thermally connected to the cooling element that is mounted at a certain spacing therefrom. In fact, the spacings typically covered by the heat pipe are several centimeters or multiple tens of centimeters.

What is thus employed according to the invention is at least one heat pipe that thermally connects the circuit board along with the electrical component mounted thereon to the cooling element. As a result, the cooling element functions as a heat sink, and any waste heat from the electrical component is transferred through the circuit board made of a heat-conducting material, and through the heat pipe ultimately to the cooling element that is connected in thermally conductive fashion thereto, and there generally dispersed over a relatively large location so as to be dissipated to the surrounding air. The heat pipe used relates to a heat carrier that provides a high heat flow density by utilizing the heat of vaporization of a heat carrier medium accommodated in the heat pipe. The heat carrier medium or working medium can be water that is accommodated in the heat pipe that is generally of a hermetically sealed design.

Whenever an input of heat occurs, for example, in the region of the circuit board, the heat transfer medium or working medium begins to vaporize. The vapor created flows toward the heat sink or the cooing element where it condenses due to the lower temperature there. In the process, the previously absorbed heat (waste heat from the electrical component mounted on the circuit board) is dissipated. The now (once again) liquid working medium returns—generally by gravity or capillary action in the case of a heat pipe—to the site of the heat input or is dispersed inside the heat pipe.

Inside heat pipes, the fluid, or the working medium generally, is recirculated to the site of the heat input by using the above-referenced capillary action. As a result, the condensed working medium is able to flow back within the capillary in a manner independent of position. As a result, heat pipes are able to operate even in zero gravity, and, in particular, independently of their installed position. The capillaries are typically in the form of a kind of wick inside the heat pipe, while the space surrounding the wick and/or inside is used to conduct the vapor.

The heat pipe generally must be mechanically evacuated before it is filled with the requisite working medium. Since the present temperature range covered is primarily between 0° C. and 100° C., one possible effective heat carrier medium or working medium is water. In addition, copper is typically used to produce the heat pipe since this can be readily formed and furthermore has high thermal conductivity. These heat pipes are currently available commercially in various lengths.

One approach that has proven effective is to ultimately design the heating element acting as the heat sink to simultaneously be an attachment flange for the described electrical circuit assembly. The resulting benefit, as it were, is two-fold. This is because a housing accommodating the electrical circuit assembly is generally made of plastic and consequently is poorly suited for direct attachment to a wall, ceiling, a housing, etc. This in fact is where the cooling element designed in the form of an attachment flange comes into use, the element providing the requisite mechanical strength for mounting the electrical circuit assembly.

This is true to an even greater degree since the attachment flange, or cooling element, is equipped in an advantageous embodiment with additional cooling ribs that simultaneously increase its strength but also in any case enlarge its surface area so as to enhance the transfer of heat to the environment. The cooling element may furthermore be equipped with a cooler, which can be, by way of example, a Peltier element. This supplemental cooler is typically employed whenever the dissipation of heat by the heat sink or cooling element is insufficient in the case of the given application.

The circuit board made of a thermally conductive material is generally supported by a housing insert that in turn is mechanically attached to the above-mentioned housing. For reasons of cost, the housing in this example is made of plastic and is usually filled with a potting compound so as to provide the requisite explosion-protective design. The potting compound, among other aspects, in fact prevents exposed contacts from causing an ignitable mixture to explode, or creating a spark that would cause such an explosion. As is the conventional approach, the potting compound is an insulating plastic that is generally poured into the housing in the inverted position when in a (viscous)-liquid state, and then hardens.

Generally, the above process typically operates with different potting compounds. This is attributable to the fact that the housing is generally of a two-part design comprising an opaque base and a transparent cover. As a result, the potting compound is generally of a transparent design in the region of the cover, whereas otherwise dark or opaque potting compound is used.

The cover and base are typically joined together simply by a plug-type connection. Once the potting compound has been poured into the inverted housing and has hardened, this compound ensures that the two parts of the housing (base and cover) are permanently attached to each other. What further enhances the strength is the fact that the housing insert supporting the circuit board is generally attached to the housing, and then obviously also to the cured potting compound.

The subject matter of the invention also includes a module that is composed of an electrical circuit assembly of the type described and is additionally equipped with an adapter. This adapter provides or ensures that not only one electrical circuit assembly but also, for example, two or more such circuit assemblies can be supplied through a common input lead. A conceivable approach is thus to combine a signal lamp with a signaling loudspeaker, or also two signal lamps or two signaling loudspeakers. This depends on what level of significance is to be attached to the alerting signal within the warning region.

As a result, what is provided is an electrical circuit assembly and a module composed of an electrical circuit assembly and the adapter distinguished first of all by the essentially unlimited diversity of design for the housing and in particular for the configuration of the light source or of the electrical component supported by the circuit board and of the associated cooling device. The invention accomplishes this in that the electrical component producing the waste heat is transmitted to the cooling element through the circuit board supporting it and one or more heat pipes.

This cooling element is advantageously mounted in a housing cutout, and is thus in thermal contact with the environment. This is also true and in particular in the event that the housing is produced entirely or predominantly out of plastic. The fact that the cooling element is simultaneously the attachment flange for the circuit assembly essentially provides a two-fold benefit. In addition, a base surface may in some cases also be used as an additional heat sink to which the cooling element or attachment flange is secured. This is because this base surface or base may be a (metal) machine housing or the like. Supplemental cooling ribs, or even an optional cooler, may provide an additional surface enlargement for the cooling element or attachment flange.

In overall terms, the described electrical circuit assembly can be designed in any manner desired starting with the shape of the housing, since the housing is typically an inexpensive injection-molded plastic part. Nevertheless, the requisite explosion-protected equipment is provided, and this is ensured not only by the reliable dissipation of the waste heat produced but also by the fact that the interior of the housing is filled with a potting compound. This potting compound also has a double function. It ensures not only that the electrical wires or the electrical component accommodated on the circuit board are hermetically sealed, but also at the same time ensures that the two housing parts (base and cover) are attached to each other in flawless fashion, specifically such that no supplemental fastening means are required at the joint. These must be considered the fundamental advantages.

BRIEF DESCRIPTION OF THE DRAWING

In the following the invention is described in more detail with reference to a drawing showing a single embodiment; therein.

DETAILED DESCRIPTION

The figures show an electrical circuit assembly intended for use in locations at risk of explosion. The electrical circuit assembly is a signal circuit assembly, in this case a signal lamp. The basic design of the circuit assembly or signal lamp includes one or more electrical components, here LEDs 1. These components or LEDs 1 are each carried on a respective circuit board 2 made of a thermally conductive material.

Here, the circuit boards 2 are made of metal, in particular aluminum. The LEDs 1 here are SMD LEDs.

Figure 1:
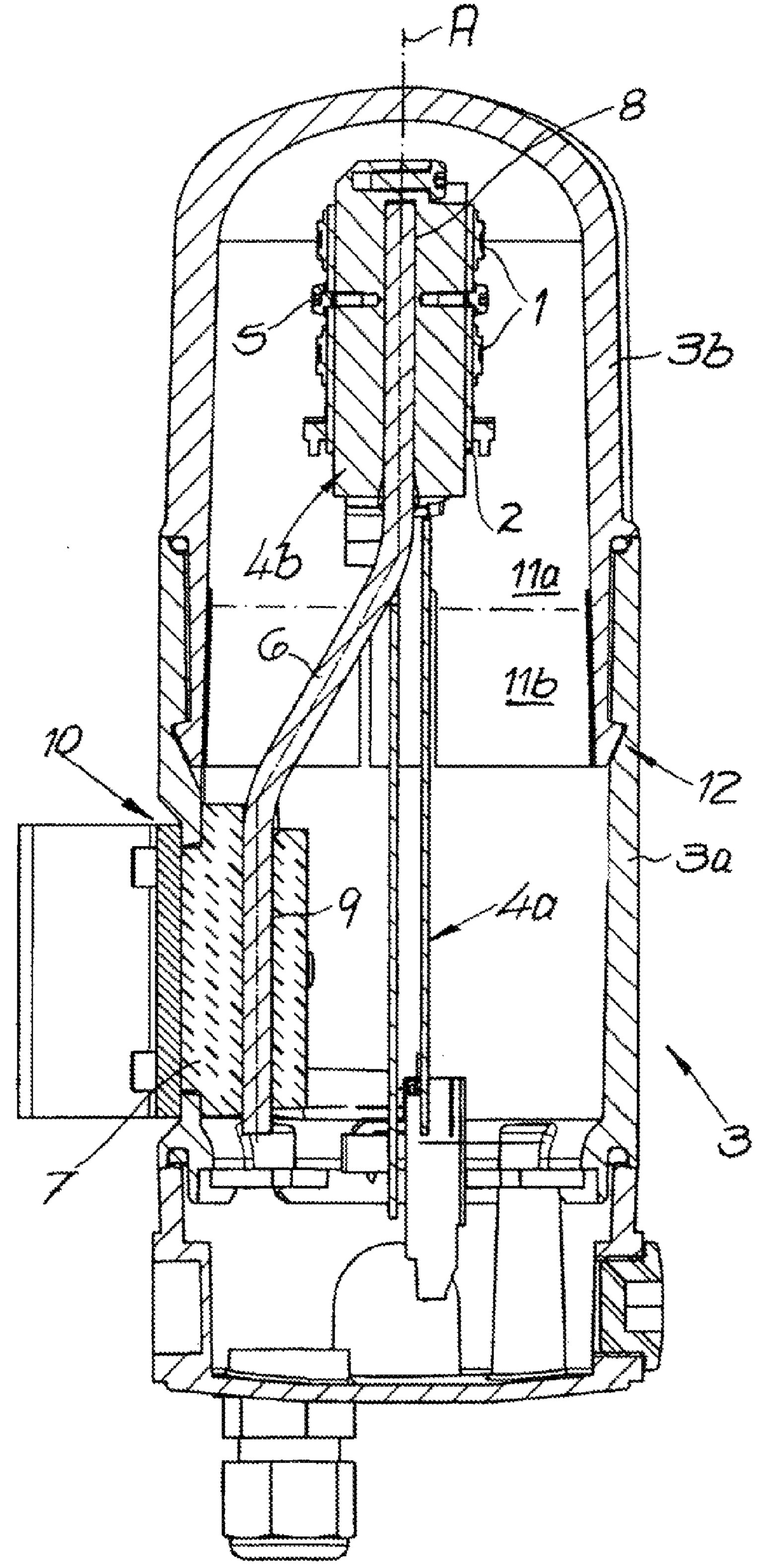
FIGS. 1 and 2 are longitudinal sections through an electrical circuit assembly.
Figure 2:
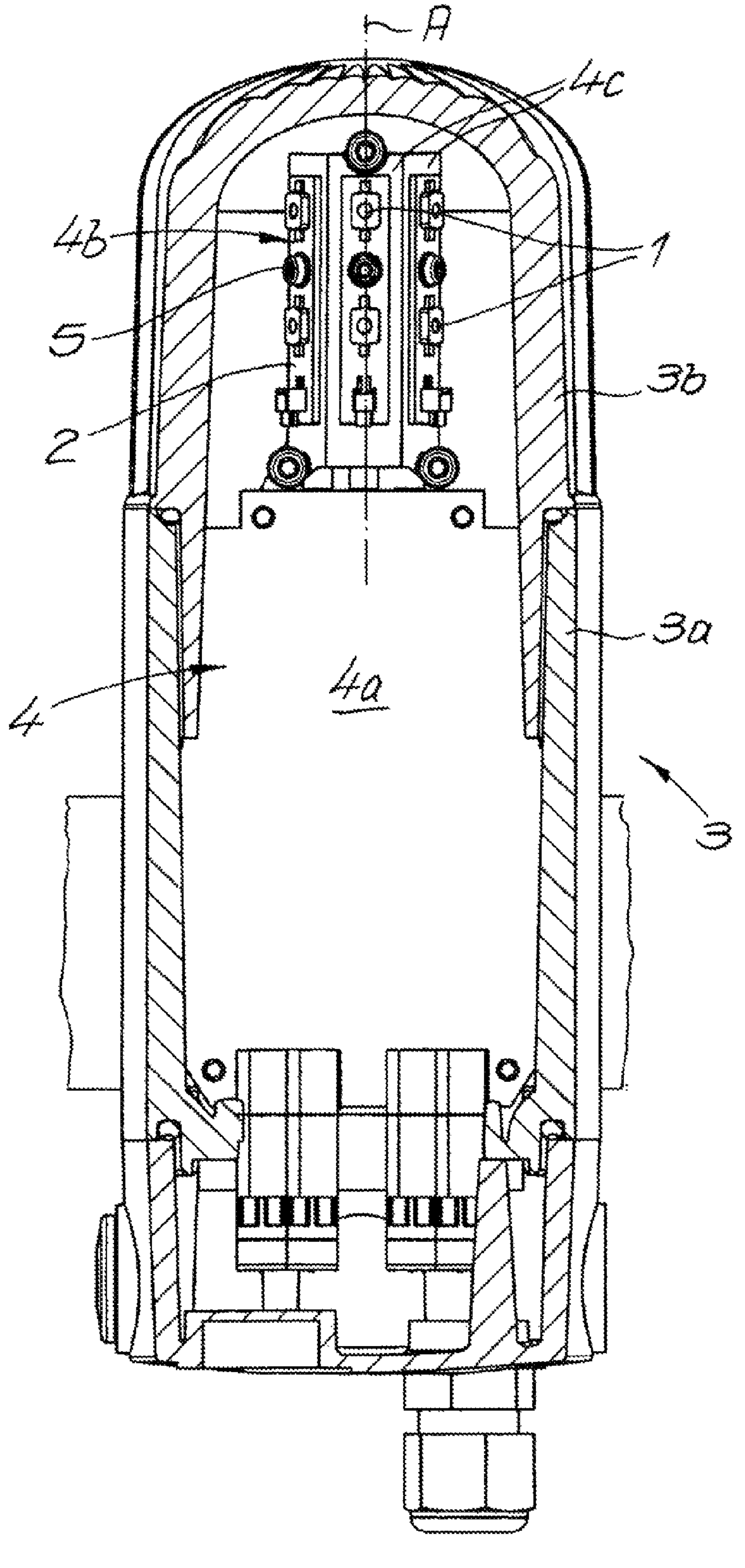

A comparison of FIGS. 1 and 2 reveals that the LEDs or light sources 1 are arranged in a circular array centered on a central axis A of a housing 3. The housing 3 is of rotation symmetrical shape centered on this axis A. The result is that the light emitted by the LEDs or light sources 1 propagates in all spatial directions, thereby ensuring 360° radiation of the light.

Each circuit board 2 is supported by an insert 4 that in turn is mechanically attached to the housing 3. The housing insert 4 is comprised of a base 4*a* and a head 4*b*, the cross-section of the head 4*b* being a polygon having side faces 4*c* that each carry a respective one of the circuit boards 2. To this end, each circuit board 2 is attached to the insert head 4*b* by one screw, or if necessary by several screws 5.

Figure 3:
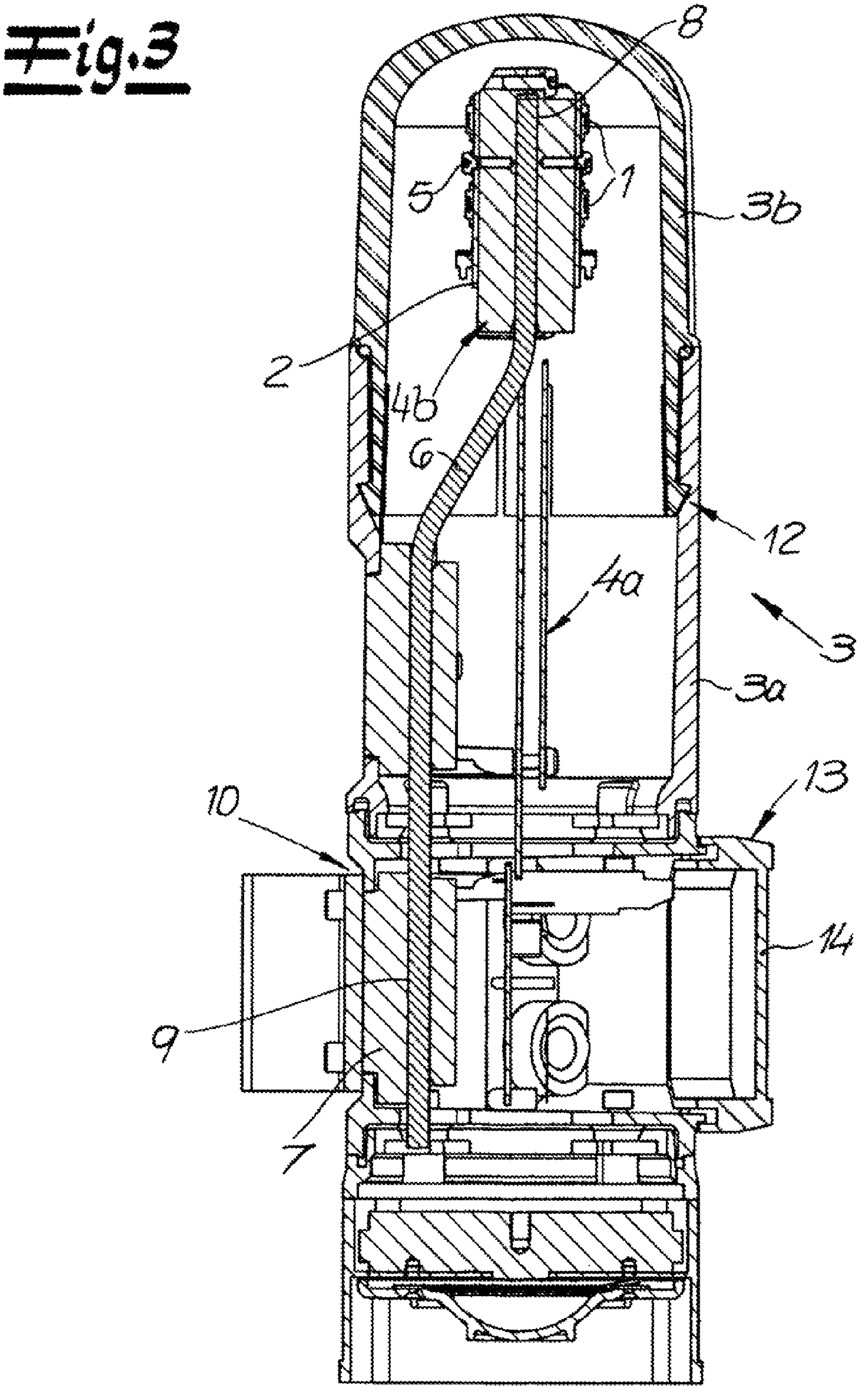
FIG. 3 shows a module composed of a modified electrical circuit assembly and an associated adapter.

A cooling device 6, 7 is in thermal contact with the circuit boards 2, this device being seen most clearly in the sectional view of FIGS. 1 and 3. According to the invention, this cooling device 6, 7 is formed by a heat pipe 6 and a cooling element 7. The heat pipe 6 thermally connects the circuit boards 2 to the cooling element 7 that is physically set at a certain spacing from the circuit boards. To achieve this, the heat pipe 6 here fits centrally in the insert head 4*b* of the housing insert 4.

As is evident in FIGS. 1 and 3, the insert head 4*b* here is a solid piece of metal (aluminum) and is provided with a central bore 8 into which fits one end of the heat pipe 6. Heat is conducted into the into heat pipe 6 at this bore 8. The cooling element 7 is also provided with a bore 9 into which fits the other end of the cooling element 7 to form the heat sink already described above. As a result, waste heat produced by the LEDs 1 flows through the head 4*b*, the heat pipe 6, and ultimately to the cooling element 7 that functions as a heat sink.

Since the heat pipe 6 in the form of a copper tube is provided with a heat carrier medium, in particular water, which is captured inside it, the heat pipe 6 can be bent easily and easily adapted to the spatial conditions inside housing 3. Any waste heat from the LEDs 1 is transmitted by the respective circuit board 2 since the electrical component or LED 1 in the example here is mounted on the circuit board 2 via a heat transfer compound or the like. The heat is transferred from the circuit board 2 to the insert head 4*b* of the housing insert 4 that is similarly made out of a thermally conductive material (metal). One end of the heat pipe 6 is in thermal contact with the insert head 4*b*.

Inside the heat pipe 6, the waste heat generated is now converted into latent heat and transported to the heat sink formed by the cooling element 7. Since the cooling element 77 also functions as an attachment flange 7 for the circuit assembly, or the housing 3 in its entirety, the heat conducted in this way is dispersed over a large area. This is especially true if the cooling element 7 is equipped with supplemental, but not explicitly shown, cooling fins. It is also possible here to utilize a supplemental cooler in the form of a Peltier element, however, this is also not shown here.

It is evident that the cooling element 7 is fitted into a housing cutout 10. As a result, the cooling element 7 is in direct thermal contact with the surrounding atmosphere. This is of particular significance in light of the fact that housing 3 in the embodiment is made of plastic and consequently has poor thermal conductivity. In any case, the waste heat from the LEDs 1 is dissipated to the surrounding air or surrounding atmosphere through the cooling element 7 that is fitted through the opening 10.

The housing 3 in this case is of an essentially two-part and cylindrical design comprising an opaque base 3*a* and a transparent cover 3*b*. The transparent cover 3*b* enables the light emitted by LEDs 1 to be easily radiated through 360°, thereby ensuring the desired signaling effect. A factor that augments this effect is that housing 3 is filled internally with a bodies 11*a*, 11*b* of potting. These potting bodies 11*a*, 11*b* are formed by being poured in a viscous state into the housing 3 when the housing is inverted, and obviously after the housing insert 4 has been installed, the LEDs 1 have been mounted, and the cooling device 6, 7 has also been put in place. Previous to this, the opaque base 3*a* and transparent cover 3*b* have been attached to each other by appropriate snap-in connections, or otherwise plugged together. Once the potting-compound bodies 11*a*, 11*b* have hardened, the transparent cover 3*b* and base 3*a* are permanently attached to each other.

The potting compound 11*a* is transparent and fills out the upper region of the housing 3 inside the cover 3*b*. The dark or opaque potting compound 11*b* is located underneath the space filled by transparent potting compound 11*a*. Both potting compounds 11*a*, 11*b* are poured in succession into the housing 3—more specifically, first the transparent potting compound 11*a* and then the opaque potting compound 11*b*.

Finally, FIG. 3 shows a module composed of the electrical circuit assembly or signal lamp described above and an adapter 13. This adapter 13 is provided with an attachment flange 14 on which a second signal lamp or even a signal loudspeaker can be mounted. Both electrical circuit assemblies are together supplied with the requisite electrical power by the adapter 13. It is evident that the two electrical circuit assemblies in the embodiment are mounted at right angles relative to each other, although this obviously is not an absolutely necessary property.

The invention claimed is:

1. An electrical signal circuit assembly for use in locations at risk of explosion, the assembly comprising:

- a hermetically sealed housing formed with a cutout and entirely of plastic;
- at least one circuit board of thermally conductive material inside the housing;
- at least one light source inside the housing on the circuit board;
- a cooling element fitted in the cutout and having an outside part at least partially outside the housing and exposed to and in contact with the atmosphere outside the housing and an inside part inside the housing and forming an attachment flange carrying and in thermal contact with the circuit board;
- at least one heat pipe inside the housing and thermally connecting the inside and outside parts of the cooling element for transmitting heat from the inside part to the outside part for dissipation to the atmosphere outside the housing; and
- at least one body of insulating-plastic potting compound filling the housing around the circuit board, light source, inside part of the cooling element, and heat pipe.

2. The electrical circuit assembly according to claim 1, wherein the outside part is provided outside the housing with additional cooling ribs or a cooler.

3. The electrical circuit assembly according to claim 1, wherein the circuit board is supported by a housing insert.

4. The electrical circuit assembly according to claim 3, wherein the housing insert is attached to the housing.

5. The electrical circuit assembly according to claim 1, wherein the housing is at least of a two-part design comprising a transparent cover holding the board and an opaque base carrying the outside part.

6. The electrical circuit assembly according to claim 5, wherein the potting compound is of varying transparency, being transparent in the region of the cover but otherwise dark or opaque.

* * * * *